June 22, 1943.   T. SJOBERG   2,322,477
MOTOR VEHICLE
Filed Nov. 8, 1940   2 Sheets-Sheet 1
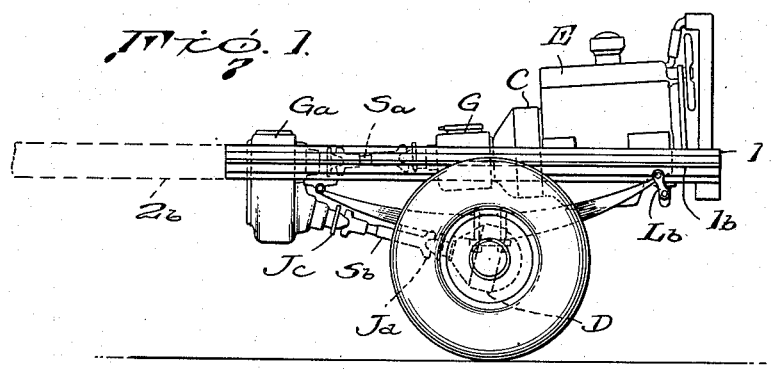
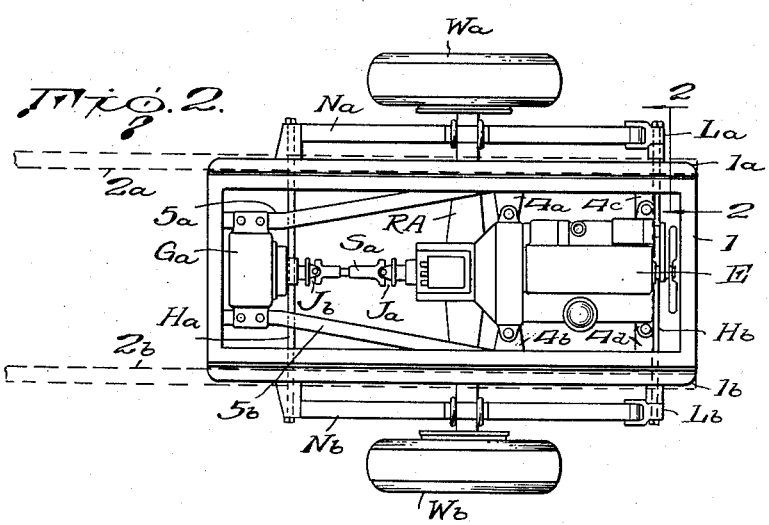
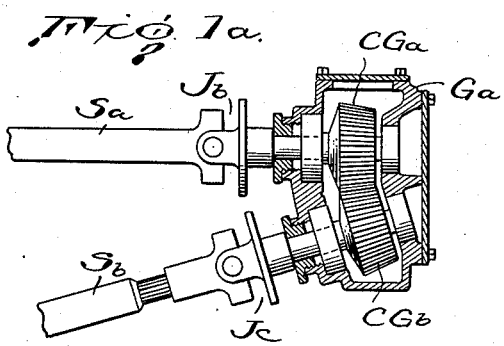
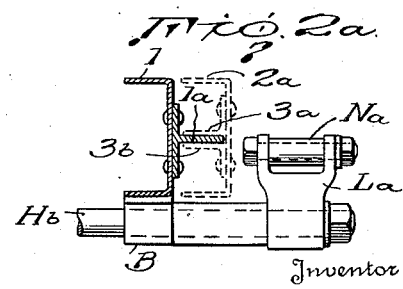
Inventor
Thor Sjoberg,
By Ralph B. Stewart
Attorney

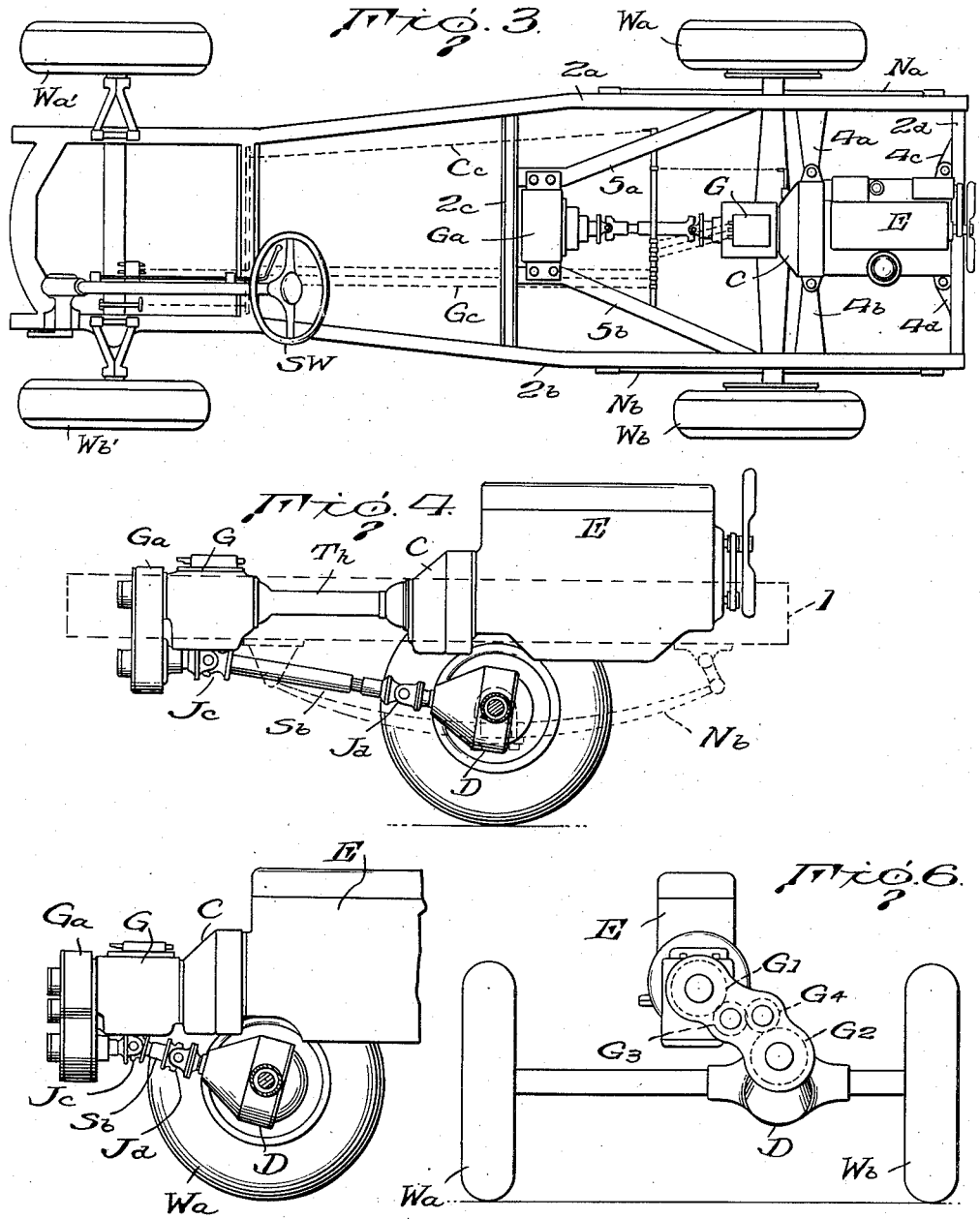

Patented June 22, 1943

2,322,477

UNITED STATES PATENT OFFICE 2,322,477

MOTOR VEHICLE

Thor Sjoberg, Alhambra, Calif., assignor of one-half to Neild H. Osburn, Pasadena, Calif.

Application November 8, 1940, Serial No. 364,919

1 Claim. (Cl. 180—54)

This invention relates to motor vehicles and in particular to motor-driven vehicles in which the driving motor is located at the rear of the vehicle.

An object of the invention is to devise a propelling arrangement by which existing motor vehicles (in which the propelling motor is located at the front of the vehicle) may be easily converted into a rear-motor vehicle in which the standard transmission parts are employed and in which the number of changes and special parts required for the conversion is reduced to a minimum.

A further object is to devise a unitary propelling arrangement for motor vehicles in which the driving engine, the traction wheel assembly, and the power transmission elements connecting the engine with the traction wheels are all mounted as a unit assembly on a separate carriage or frame which may be detachably secured to a motor vehicle.

Another object is to devise a unitary propelling arrangement for motor vehicles in which the driving engine and certain transmission elements are mounted upon a separate carriage or frame which may be detachably secured to a motor vehicle, and the separate frame is mounted upon the axle of the traction wheels by spring members adequate to support the vehicle load as well as the load of the unitary propelling arrangement.

Still another object is to devise a novel construction for detachably securing the unitary propelling arrangement of my invention to a motor vehicle.

In general, according to my invention, the engine or motor, together with the usual clutch and change-speed gearing are mounted as a unit at the rear of the vehicle in a position such that the engine extends substantially to the rear of the rear axle and faces to the rear of the vehicle. The output shaft of the change-speed transmission is connected to drive a fixed-ratio transmission gearing carried by the frame of the vehicle and located forwardly of the rear axle, and the output or driven shaft of the fixed-ratio transmission gearing is connected through suitable shafting to the differential located in the rear axle of the vehicle, the power shaft being connected to the rear axle in the same relation or direction as the power shaft is normally connected. In one form of my invention the engine, the clutch, the standard change-speed transmission, and the fixed-ratio transmission are all mounted on a sub-frame or sub-chassis which is detachably secured to the main frame or chassis of the vehicle. The sub-frame supporting the engine and other parts is mounted by a suitable spring mounting upon the rear axle. The spring mounting for the sub-frame on the rear axle also serves to carry the rear axle load from the main frame.

A number of modifications of my invention are illustrated in the accompanying drawings in which:

Figure 1 is a side elevational view showing one form of propelling arrangement embodying a sub-frame mounted upon the rear axle of the vehicle;

Fig. 1a is a fragmentary view partly in section showing the details of construction of the fixed-ratio transmission gearing;

Figure 2 is a plan view of Figure 1;

Figure 2a is a sectional view, on an enlarged scale, taken along line 2—2 of Figure 2 for mounting the sub-frame on the supporting springs;

Figure 3 is a plan view showing a propelling arrangement similar to Figures 1 and 2, but mounted upon the main frame of the vehicle;

Figure 4 shows a modification of the arrangement illustrated in Figures 1 and 2; and Figures 5 and 6 are side and end views, respectively, showing the use of a four-gear fixed-ratio transmission gearing for use in connection with a rear axle having an offset differential.

Referring to Figures 1, 2, and 2a, the sub-frame supporting the motor and transmission elements comprises a rectangular frame 1, preferably formed of channel iron with the web of the channel arranged vertical and the flanges directed inwardly as shown in Figure 2a. A pair of T-section members are suitably secured as by riveting along the outside of the longitudinal side members of frame 1, and the two webs of these T members extend outwardly and form horizontal flanges running substantially throughout the length of the sub-frame. The two side beams of the main vehicle frame or chassis are indicated in dotted lines at 2a and 2b, and the sub-frame 1 is formed to fit snugly between these two side beams 2a and 2b. The sub-frame 1 is detachably secured to beams 2a and 2b by means of longitudinal channels formed on the beams 2a and 2b by securing to the inner face of the web of each beam a pair of spaced angle irons 3a and 3b as shown in Figure 2a, the flange 1a being received between these spaced angle irons. The rear ends of the beams 2a and 2b are not connected so that by sliding the sub-frame 1 to the right as shown in Figure 2, the sub-frame may be removed from the main frame. It will be understood that the sub-frame is secured against sliding in the main frame by any suitable means, such as by bolting.

The vehicle motor or engine E is suitably mounted in the sub-frame 1 adjacent the rear end thereof by means of suitable brackets 4a, 4b, 4c, and 4d secured to the sub-frame and extending under corresponding brackets secured to, or formed integral with, the engine frame. In the case of pleasure cars, suitable rubber cushions are interposed between each set of cooperating brackets, in accordance with known construction to provide a floating mounting for the engine or motor. The engine E may be of any suitable known construction and the propelling arrangement also includes a clutch C attached to the engine and a suitable change-speed gearing G attached to the clutch and forming an integral unit with the engine E and the clutch C. As will be seen in Figure 2, the engine in mounted in reverse position from the normal position, that is, the engine faces to the rear of the main frame and the drive shaft extending out of the gearing G extends in a forward direction. A second transmission gearing Ga of fixed drive ratio is located at the forward end of the sub-frame 1 and is mounted upon the sub-frame by means of a torque frame consisting of members 5a and 5b secured across the corners of sub-frame 1 at the forward end thereof as shown in Figure 2. The output shaft of the standard transmission gearing G is connected to the input shaft of the gearing Ga by means of a flexible coupling consisting of shaft Sa and two universal joints Ja and Jb. The output shaft of gearing Ga is connected through shaft Sb and two universal joints Jc and Jd to the differential D forming part of the rear axle housing RA. Both flexible driving connections interposed between G—Ga and Ga—D include a splined coupling to allow for end play or movement. The rear wheels of the vehicle mounted on the rear axle are indicated at Wa and Wb.

The sub-frame 1 is supported upon the rear axle housing RA by means of suitable leaf springs Na and Nb clamped at their centers to the rear axle housing RA. The springs may be clamped above the axle housing as in Figure 1 or below the housing as in Figure 4. The forward ends of springs Na and Nb are pivotally secured to the outer ends of a hanger rod Ha arranged transversely of the forward end of the sub-frame 1, and the rear ends of springs Na and Nb are pivotally secured to hanger links La and Lb, which in turn are pivotally mounted on opposite ends of a second hanger rod Hb arranged transeversely of the sub-frame 1 at the rear end thereof. Hanger rods Ha and Hb are secured to the sub-frame 1 by suitable brackets B bolted or riveted to the lower flange of sub-frame 1 on opposite sides thereof, see Figure 2a.

The arrangement shown in Figures 1 and 2 comprises a complete propelling unit including the rear vehicle traction wheels, the rear vehicle supporting springs, the propelling motor and all transmission elements for driving the vehicle, the unit being readily attached to and removed from the main frame of the vehicle. Further, it will be seen that the engine is mounted substantially entirely to the rear of the rear axle and is positioned so that its drive shaft extends in a forward direction to the fixed-ratio transmission, and the fixed-ratio transmission is connected to the differential gearing in the rear axle by a drive shaft which is arranged in the normal position, that is, a drive shaft which enters the differential gearing from the front. In this arrangement, all of the power or transmission elements, except the fixed drive ratio gearing Ga are of standard construction, and the only transmission element which must be supplied for converting existing vehicles of the front engine type into a rear engine drive is the fixed ratio gearing Ga.

In converting existing front-engine vehicles to rear-engine drives, the gearing Ga serves an important function in reversing the direction of rotation between the engine shaft and the propeller shaft leading to the differential. Normally, in front engine drives both the engine and the propeller shaft turn in a clockwise direction. When the engine is reversed and placed at the rear of the vehicle, the engine shaft rotates in an anti-clockwise direction with respect to the propeller shaft, so it is necessary to use gears Ga to secure the reversal in direction of rotation between the engine shaft and the propeller shaft.

The fixed-ratio gearing Ga may be formed of any suitable construction, but I have illustrated one arrangement in Figure 1a consisting of two meshing conical gears CGa and CGb mounted upon suitable ball-bearings or roller-bearings in an oil-tight housing. The conical gears are preferably provided with helical teeth and the gears are arranged with their axes in line with the shafts Sa and Sb. In the preferred construction of the gearing Ga as shown in Figures 1 and 1a, the transmission gears CGa and CGb are shown as having a one to one ratio which permits the transmission from the engine to the differential gearing without loss in torque, but it will be understood that the gear ratio may be higher or lower than one to one ratio where it is desired to change the torque ratio between the shafts Sa and Sb. Also, the preferred arrangement shown in Figure 1a in which the gears CGa and CGb are arranged in alignment with their respective shafts Sa and Sb, produces an arrangement in which the friction loss is reduced to a minimum and there is less tendency for the drive shafts to vibrate at high speed operation. It will be understood, however, that the gearing may consist of two spur gears having parallel axes as in Figure 4.

In Figure 3, I have illustrated substantially the same propelling arrangement as shown in Figures 1 and 2, except that the various transmission elements, including the engine E, have been centered and mounted directly upon the main frame or chassis of the vehicle and the sub-frame has been omitted. A transverse frame member 2c joins the two side beams 2a and 2b and a second transverse frame member 2d joins the rear end of the side beams 2a and 2b to form a frame construction substantially in accordance with the sub-frame 1 shown in Figures 1 and 2. Frame members 5a and 5b arranged across the corners between frame member 2c and side beams 2a and 2b form a torque frame for supporting the fixed ratio transmission Ga in a manner similar to the arrangement of Figure 2. The engine E is mounted in the same manner as in Figure 2, except that brackets 4a, 4b, 4c, and 4d are secured to the main vehicle frame. The vehicle rear traction wheels Wa and Wb mounted upon the rear axle are secured to the main frame in the usual manner by means of leaf springs Na and Nb. The front wheels Wa' and Wb' are steered in any suitable manner by steering wheel SW. Suitable control rods, cables or other operating devices shown in dotted lines at Gc and Cc are provided for operating the change-speed gearing G and the clutch C, respectively, from the front of the car. Since these devices form no part of my invention they are not illustrated in detail.

In Figure 4, I have shown an arrangement similar to that illustrated in Figures 1 and 2 which may be mounted either in a sub-frame or directly on the main frame of the vehicle. In this arrangement, the engine E is mounted above and to the rear of the rear axle housing as in Figure 1, the clutch C being secured to the engine casing. Instead of having the change-speed gearing G mounted immediately adjacent the clutch C, this gearing is mounted forward of the clutch and is secured to the clutch by means of a tubular torque housing Th which encloses the engine drive shaft. The fixed drive ratio gear Ga is mounted rigidly with the variable transmission gear G, and the output shaft of the gearing Ga is connected to the differential D through a flexible drive connection including the shaft Sb and two universal joints Jc and Jd. The drive connection also includes a splined coupling to allow for end play. The spring mounting shown in Figure 4 is substantially like that shown in Figures 1 and 2, except that the springs are mounted beneath the axle housing instead of above the housing, and the method of attaching the springs to the chassis is along conventional lines. In the arrangement of Figure 4, the engine E, the clutch C, the torque housing Th and the gear sets G and Ga are all secured together as a unit and may be rigidly mounted in a sub-frame or in the main frame of the chassis. One advantage of the arrangement shown in Figure 4 is the elimination of the exible drive shaft between the engine and the fixed-ratio gearing Ga. If desired, the arrangement of Figure 4 might be modified by eliminating the tubular housing Th and mounting the change-speed gearing G directly upon the clutch, as shown in the arrangement in Figure 5.

In Figures 5 and 6, I have shown side and front views of a modification of my invention in which the differential in the rear axle is offset with relation to the middle of the axle. This arrangement is substantially the same as the arrangement shown in Figure 4, except for the omission of the torque tube Th and the use of a 4-gear fixed-ratio transmission, instead of a 2-gear transmission. As will be seen in Figure 6, the fixed ratio gearing comprises an input gear G1 arranged in line with the engine shaft (or in line with the output shaft of the change-speed gearing G), an output gear G2 arranged in the vertical plane passing through the differential D, and two intermediate idler gears G3 and G4 interposed between the input gear G1 and the output gear G2. The output gear G2 is connected to the differential D through a flexible shaft connection like that shown in Figure 4. The arrangement of Figures 5 and 6 may be mounted either in a sub-frame or sub-chassis, or in the main frame or main chassis, as desired. The chassis part of the construction has been shown in Figures 5 and 6 for the sake of clearness of illustration.

While I have illustrated and described a number of modifications of my invention, it will be obvious that other modifications are possible, and my invention is not to be limited except in accordance with the appended claim in which the terms "chassis" or "frame" are to be interpreted broadly to apply either to a construction involving a sub-frame or sub-chassis as in Figure 2, or a construction where the transmission elements are mounted upon the main frame or chassis as in Figure 3.

What I claim is:

In a motor vehicle, the combination of a chassis, a rear wheel and axle assembly including a differential gearing for driving said axle, spring means for mounting said chassis upon said rear wheel and axle assembly, a motor mounted upon said chassis substantially entirely to the rear of said axle, a clutch mounted upon said motor and forming a unit therewith, a change-speed gearing mounted upon said chassis forwardly of said axle, a torque tube connecting the housing of said clutch to the housing of said change-speed gearing and forming a housing for a drive shaft connecting said engine to said change-speed gearing, a fixed-ratio transmission gearing supported at the forward end of said change-speed gearing and being driven by said change speed gearing, and a flexible driving connection extending rearwardly from said fixed-ratio gearing to said differential gearing.

THOR SJOBERG.